United States Patent [19]
Kind et al.

[11] 3,796,891
[45] Mar. 12, 1974

[54] CIRCUIT ARRANGEMENT FOR THE INTERRUPTION OF CURRENT

[75] Inventors: Dieter Kind, Knappstrasse 4; Hagen Hartel, both of Braunschweig, Germany

[73] Assignee: said Kind, by said Hartel

[22] Filed: July 21, 1972

[21] Appl. No.: 274,102

[30] Foreign Application Priority Data
July 24, 1971 Germany............................ 2137082

[52] U.S. Cl. .............................. 307/135, 317/11 C
[51] Int. Cl. ............................................. H01h 9/30
[58] Field of Search.................... 307/134, 135, 136; 317/11 R, 11 A, 11 B, 11 C, 11 D, 11 E; 200/144 AP

[56] References Cited
UNITED STATES PATENTS

| | | |
|---|---|---|
| 3,737,724 | 6/1973 | Salge et al. .......................... 307/136 |
| 3,522,472 | 8/1970 | Breitholtz....................... 317/11 E X |
| 2,094,361 | 9/1937 | Lee................................... 307/136 X |
| 3,309,570 | 3/1967 | Goldberg.......................... 317/11 A |

OTHER PUBLICATIONS
1,272,418 (Auslegeschrift), Kindel, July 11, 1968, 2 page spec., 1 sheet dr.

Primary Examiner—Robert K. Schaefer
Assistant Examiner—M. Ginsburg
Attorney, Agent, or Firm—Spencer & Kaye

[57] ABSTRACT

A circuit arrangement for current limiting interruption of current at high voltage includes a plurality of series connected individual commutation stages. Each stage has an energy dissipating member, such as a resistor. A single commutation capacitor is provided. Switching devices are operatively arranged for consecutively switching the single commutation capacitor into each stage in parallel with the respective energy dissipating member included in each stage.

10 Claims, 11 Drawing Figures

CIRCUIT ARRANGEMENT FOR THE INTERRUPTION OF CURRENT

BACKGROUND OF THE INVENTION

This invention relates to a circuit arrangement for the current limiting interruptions of direct and alternating currents at high voltage. The present invention relates, more particularly, to a circuit arrangement for the current limiting interruption of direct and alternating currents at high voltage in which the current to be interrupted passes through a plurality of electrically series connected commutation stages, each stage including an energy dissipating device. A single commutation capacitor is used consecutively in each stage. The current to be interrupted is reduced to a residual value which may be switched off by opening a switch.

A circuit arrangement for the current limiting interruption of direct and alternating currents at high voltage is known in which a commutation switch is connected in parallel with a capacitor which removes current from the switch and which is charged by the current to be switched off to such a high voltage that this current commutates to a parallel connected high-ohmic resistor (energy absorber) and is reduced to an easily interruptable residual current value. Such a circuit arrangement is disclosed in the publication ETZ/A, volume 89, No. 18 (1968), pages 421–423.

A circuit arrangement, particularly suited for the residual current interruption has been disclosed in the Federal Republic of Germany Pat. No. 1,272,418 issued Feb. 6th, 1969. As shown in the German patent, the circuit arrangement includes a residual current switch with a parallel excess voltage protection circuit consisting of series connected spark quenching paths, a resistor and a capacitor.

The above-mentioned prior art circuit arrangements, can be designed for the interruption of currents at still higher voltages by the provision of a series connection of a plurality of commutation switching paths and parallel auxiliary paths. In such a case, the expenditures for the plurality of switching paths, a required plurality of commutation capacitors and a required plurality of energy dissipating resistors are proportional to the required switching voltage.

SUMMARY OF THE INVENTION

It is an object of the present invention to provide a circuit arrangement for the current limiting interruption of current at high voltage which is equally effective as the above-mentioned series connection of known circuit arrangement and has fewer expensive parts.

It is another object of the present invention to provide a circuit arrangement for the current limiting interruption of current at high voltage which utilizes a single commutation capacitor in each stage of a plurality of commutation stages.

It is a further object of the present invention to provide a circuit arrangement for the current limiting interruption of current at high voltage which utilizes a single commutation switching path in each stage of a plurality of commutation stages.

The foregoing objects, as well as others which will become apparent from the text which follows, are accomplished in accordance with the present invention by providing a circuit arrangement for the current limiting interruption of current at high voltage. The circuit arrangement includes a plurality of series connected individual commutation stages. Each stage has an energy dissipating member, such as a resistor. A single commutation capacitor is provided. Switching devices are operatively arranged for consecutively switching the single commutation capacitor into each stage in parallel with the respective energy dissipating member included in each stage. In a preferred form, the circuit arrangement also includes a single commutation switch connected in parallel with the single commutation capacitor.

It is a desirable characteristic of the present invention that the circuit arrangement contains only one commutation capacitor or only one commutation capacitor and one commutation switching path. These elements are consecutively connected, by means of controllable auxiliary switching paths, into the individual commutation stages to serve their purpose.

DETAILED DESCRIPTION OF THE PREFERRED EMBODIMENTS

Figure 1:
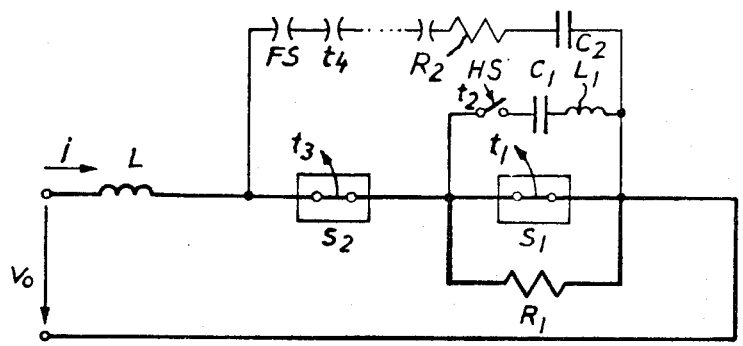
FIG. 1 is a schematic diagram of a known current limiting circuit arrangement.

In order to facilitate understanding of the present invention, the known current limiting circuit arrangement illustrated in FIG. 1 shall first be described in which $V_0$ is the voltage, which drives initially a current $I_0$ (FIG. 2) to be cut off through an inductance L, a residual current switch $S_2$ and a commutation switch $S_1$. A commutation capacitor $C_1$ and an energy dissipating resistor $R_1$ are each separately connected in parallel with the commutating switch $S_1$. The energy dissipating resistor $R_1$ is preferably a current dependent resistor. An auxiliary switch HS and an inductance $L_1$ are connected in series with the commutation capacitor $C_1$. A known excess protection voltage circuit is connected in parallel with the series connected switches $S_1$ and $S_2$;

this circuit includes a series connection of a spark path FS, a current limiting resistor $R_2$ and a capacitor $C_2$. The spark path, as illustrated, is formed by a plurality of series connected spark gaps.

Figure 2:
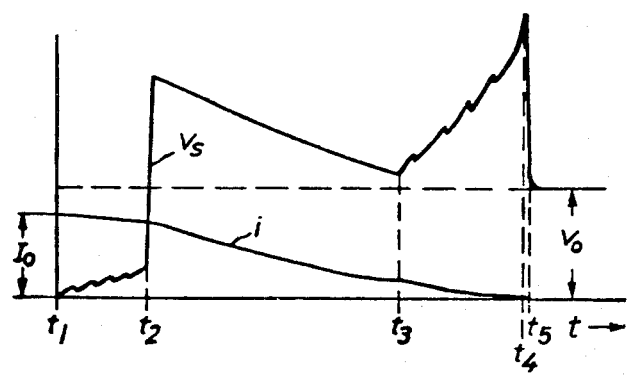
FIG. 2 is a graphic representation of current and voltage levels plotted against time helpful in understanding the operation of the circuit of FIG. 1.

According to FIG. 2 the initial current $I_0$, which is to be cut off in the circuit of FIG. 1, flows during a period of time preceding time $t_1$. At time $t_1$ the commutation switch $S_1$ opens and produces an arc voltage; after several ms, at time $t_2$, the auxiliary switch HS closes. The current commutates into the commutation capacitor $C_1$ and charges it. Depending on the voltage across the commutation capacitor $C_1$, the current i is commutated to the preferably current dependent, energy dissipating resistor $R_1$ which is so designed that for a current level $I_0$, $R_1(I_0)$  $I_0 > V_0$ so that the current $i$ can be reduced. If the current $i$ has dropped approximately to the residual value $I_R$, $I_R = V_0/R_1(I_R)$ which, depending on the size of the energy dissipating resistor $R_1$, is several percent to several ten percent of the initial current $I_0$, the residual current switch $S_2$ is opened at time $t_3$ and produces, in cooperation with the series connected energy dissipating resistor $R_1$, a voltage greater than the driving voltage $V_0$ which further reduces the current $i$. If undue excess voltages are produced across the switching circuit which includes the commutation switch $S_1$ and the residual current switch $S_2$, the excess voltage protection circuit responds at time $t_4$. The series connection of the spark path FS, the current limiting resistor $R_2$ and the capacitance $C_2$ produces a voltage directed opposite to the excess driving voltage, absorbs the residual energy and finally switches off the current $i$ at time $t_5$.

The figures described below illustrate circuit arrangements according to exemplary embodiments of the present invention and, as well, associated diagrams relating to the commutation function of the circuit arrangements. In the following discussion the initial current $I_0$ to be interrupted is assumed to be approximately constant during the period of the commutation.

Figure 3:
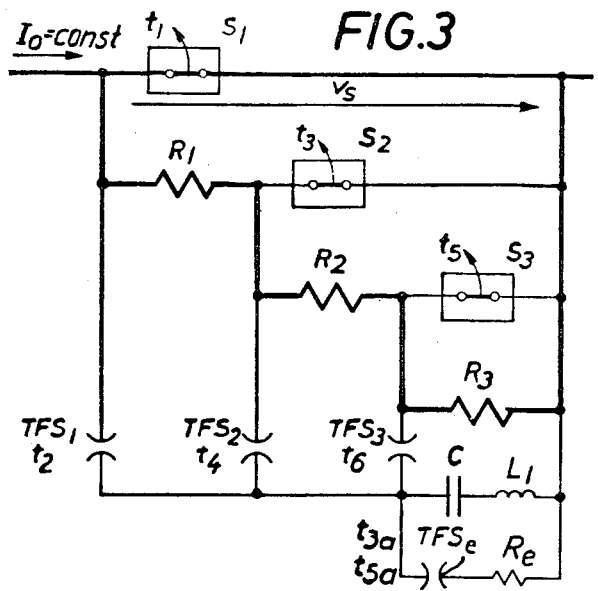
FIG. 3 is a schematic diagram of a circuit arrangement for the multiple utilization of a single commutation capacitance in each of a plurality of commutation stages according to the present invention.

FIG. 3 shows a circuit arrangement according to the present invention in which three commutation switching paths, which include respectively three commutation switches $S_1$, $S_2$, and $S_3$, are arranged in cascade. Three energy dissipating resistors $R_1$, $R_2$ and $R_3$ are connected in series with each other. The resistors $R_1$, $R_2$ and $R_3$ are preferably of equal ohmic size. For the commutation of the initial current $I_0$ to be switched off from the switching paths into the associated absorbers, e.g., from $S_1$ to $R_1$, $S_2$ to $R_2$ and $S_3$ to $R_3$ a single commutation capacitor C is used. Each time the single commutation capacitor C is connected in parallel with the respective commutation switches $S_1$, $S_2$, and $S_3$ via controllable auxiliary switching paths, and it is discharged via an auxiliary circuit after a commutation period. For the given circuit arrangement, only one-third of the storage capacity of the capacitor C is required than that which would be otherwise necessary if each commutation stage were provided with its own separate commutation capacitor. The ratio of expenditures for a single commutation capacitor C with multiple utilization to multiple capacitors with single utilization is 1:3 for the three-stage circuit arrangement and is 1:$n$ for the n-stage circuit arrangement.

Figure 4:
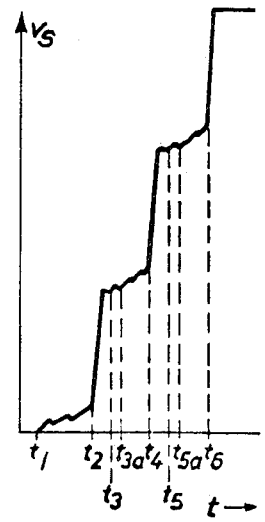
FIG. 4 is a graphic representation of current and voltage plotted against time helpful in understanding the operation of the circuit shown in FIG. 3.

The operation of the circuit arrangement shown in FIG. 3 is best understood by reference to FIG. 4.

The initial current $I_0$, which is to be commutated and reduced by the circuit arrangement of FIG. 3, flows during a period of time preceding time $t_1$. At the time $t_1$ (FIG. 4) the commutation switch $S_1$ opens and produces an arc voltage. At time $t_2$ a spark triggering path $TFS_1$ is triggered (e.g., at the level of the arc voltage produced at the commutation switch $S_1$), and the current $I_0$ commutates to the commutation capacitor C which becomes charged. According to the voltage across the commutation capacitor C, the current $i$ is commutated to the energy dissipating resistor $R_1$. If the voltage across the commutation capacitor C is $V_C = I_0 R_1$, all of the current $I_0$ flows through the resistor $R_1$ and the commutation switch $S_2$. The spark triggering path $TFS_1$ no longer carries current and again becomes stabilized. In the further course of the current interrupting process it must not again be triggered. At time $t_3$ the commutation switch $S_2$ opens and produces an arc voltage. At time $t_{3a}$, a time selected to assure that the path $TFS_1$ has again become fully stabilized, a spark path $TFS_e$ is triggered, the commutation capacitor C discharges via a discharge resistor $R_e$ and, upon restabilization of spark path $TFS_e$, the commutation capacitor C is ready for the next commutation step. At time $t_4$ a spark triggering path $TFS_2$ is triggered and the current $i$ can commutate from the commutation switch $S_2$ into the commutation capacitor C, which is again charged until $V_C = I_0 R_2$ and the entire current flows through the resistors $R_1$ and $R_2$ and the commutation switch $S_3$; the arc across the spark path $TFS_2$ is quenched. Analogous to the above-described function, the commutation switch $S_3$ opens at time $t_5$ and produces an arc voltage, the commutation capacitor C is discharged at time $t_{5a}$ and at time $t_6$ the commutation circuit is again switched on, this time via a spark path $TFS_3$, and the commutation capacitor C is recharged until $V_C = I_0 R_3$ and the arc across the spark path $TFS_3$ is quenched. The commutation into the energy dissipating resistors $R_1$, $R_2$ and $R_3$ is now completed. The switch voltage $v_s$ is now composed of the value $v_s = i(R_1 + R_2 + R_3)$. With appropriate dimensioning, the functions of the capacitor discharge circuit formed by the spark path $TFS_e$ and the resistor $R_e$ can be taken over by the spark path $TFS_3$ and the resistor $R_3$. In such a case, however, the time $t_{5a}$ would have to occur before the time $t_5$.

The step-wise commutation of current in the circuit arrangement according to FIG. 3 has the advantage that the full main current flows only through the commutation switch $S_1$. The contacts of the commutation switches $S_2$ and $S_3$ need only be designed for very short current flow periods (several ms).

Figure 5:
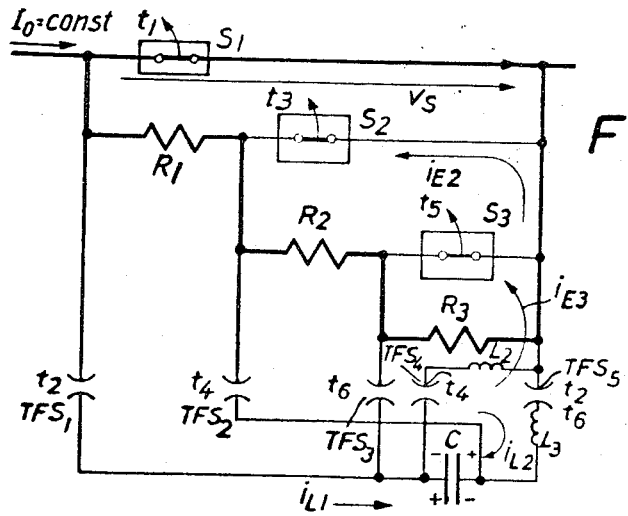
FIGS. 5 and 6 are respective schematic diagrams of two circuit arrangements according to additional respective embodiments of the present invention in which the charge on the single capacitance by a preceding commutation is utilized advantageously for the next subsequent commutation.

A simplification of the commutation of the current from the switching paths may be obtained by providing that the commutation capacitance, precharged by a previous commutation in one stage, is discharged during a subsequent commutation in the next succeeding stage in such a manner that the discharge current in the respective commutation switch is always directed against the main current. Particularly effective is a current dependent precharge of the commutation capacitor C. Such a circuit arrangement is shown in FIG. 5. A discharge circuit for the commutation capacitor C, as provided in FIG. 3, is not necessary in the circuit arrangement of FIG. 5. Instead, two additional, triggered spark paths $TFS_4$ and $TFS_5$ are provided via which the terminals of the single commutation capacitor C can be effectively exchanged.

In the circuit arrangement shown in FIG. 5 at time $t_1$ the commutation switch $S_1$ opens and produces an arc voltage. At time $t_2$ spark triggering paths $TFS_1$ and $TFS_5$ are triggered and the initial current $I_0$ commutates to the commutation capacitor C which is charged by current $i_{L1}$. According to the voltage across the commutation capacitor C, the current $i$ is commutated to an energy dissipating resistor $R_1$. For $V_C=I_0R_1$ the current $i$ flows through the resistor $R_1$ and a commutation switch $S_2$, and the spark path $TFS_1$ and the spark path $TFS_5$ are quenched. The spark path $TFS_1$ must not again be triggered during the further course of the current interrupting process. At time $t_3$ the commutation switch $S_2$ opens and produces an arc voltage. At time $t_4$ a switching spark path $TFS_2$ and the spark path $TFS_4$ are triggered and the commutation capacitor C discharges through the commutation switch $S_2$ with a discharge current $i_{E2}$, so that the commutation of the current $I_0$ from the commutation switch $S_2$ into commutation capacitor C is favored. After commutation of the current $I_0$ from the commutation switch $S_2$ into the commutation capacitor C, the commutation capacitor C is again charged but in opposite polarity by a charging current $i_{L2}$. For $V_C = I_0R_2$ the current $I_0$ flows fully through the resistors $R_1$ and $R_2$ and a commutation switch $S_3$ and the spark paths $TFS_2$ and $TFS_4$ are quenched. In the further course of the current interruption process, the spark path $TFS_2$ must not again be triggered. At time $t_5$ a commutation switch $S_3$ opens and produces an arc voltage. At time $t_6$ a spark path $TFS_3$ and the spark path $TFS_5$ are triggered and the commutation capacitor C discharges with current $i_{E3}$ over the commutation switch $S_3$ and favors commutation of the current $I_0$ from the commutation switch $S_3$ into the commutation capacitor C. The capacitor C is again charged until $V_C = I_0R_3$ and the current $I_0$ finally flows through all three of the series connected energy dissipating resistors $R_1$, $R_2$ and $R_3$ and can thus be reduced to a residual value in the manner discussed in connection with FIGS. 1 and 2. The resistors $R_1$, $R_2$ and $R_3$ are preferably of equal ohmic size.

Compared to the circuit arrangement shown in FIG. 3, the circuit arrangement of FIG. 5 has the advantage that the commutation switches $S_2$ and $S_3$ are relieved of considerable current levels by the capacitor C discharge, and need not be of as high a quality as the corresponding switches used in the circuit arrangement of FIG. 3. The additional inductances $L_2$ and $L_3$ serve to delay additionally the discharging process of the commutation capacitor C and thus the demands on the commutation switches are further reduced.

Figure 6:
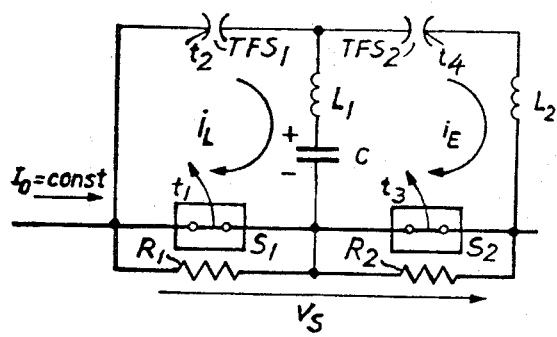

A circuit arrangement similar in operation to the circuit arrangement of FIG. 5 is shown in FIG. 6. The difference is that the commutation switches $S_1$ and $S_2$ are arranged in series in the circuit arrangement of FIG. 6. A single capacitor C again provides the commutation capacitance, $TFS_1$ and $TFS_2$ are respective triggered spark paths connected respectively in series with stray inductance $L_1$ and additional inductance $L_2$. $R_1$ and $R_2$ are energy dissipating resistors. The resistors $R_1$ and $R_2$ are preferably of equal ohmic size.

Figure 7:
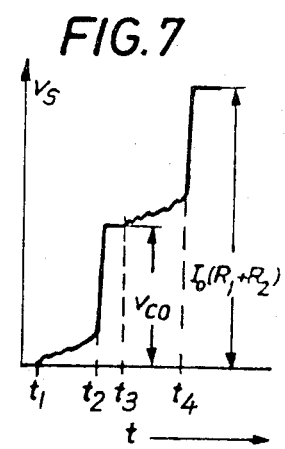
FIG. 7 is a graphic representation of current and voltage plotted against time helpful in understanding the operation of the circuit shown in FIG. 6.

For a period preceding time $t_1$ initial current $I_0$ which is to be interrupted flows through the commutation switches $S_1$ and $S_2$. At time $t_1$ (FIG. 7) the commutation switch $S_1$ opens and produces an arc voltage. At time $t_2$ the commutation circuit is added via the spark triggering path $TFS_1$, the current commutates into the commutation capacitor C and charges it until $V_C = I_0R_1$, the current $i$ flows fully through the energy dissipating resistor $R_1$ and the commutation switch $S_2$ and the arc in the spark path $TFS_1$ is quenched and the spark path $TFS_1$ becomes again stabilized. In the further course of the current interruption the spark path $TFS_1$ must not be again triggered. At time $t_3$ the commutation switch $S_2$ opens and produces an arc voltage. At time $t_4$ the commutation circuit is connected in parallel with the commutation switch $S_2$. The current-dependently precharged commutation capacitor C discharges through the additional inductance $L_2$ and the commutation switch $S_2$ so that a current $i_E$ of opposite polarity is superimposed on the main current in the commutation switch $S_2$, so that commutation of the current from the commutation switch $S_2$ into the auxiliary path is favored. After quenching of the arc across the commutation switch $S_2$, the commutation capacitor C is recharged until $V_C=I_0R_2$ and the current $i$ fully flows into the energy dissipating resistor $R_2$. The switch voltage $v_s$, under these conditions, is formed of $v_s=i(R_1+R_2)$.

The principal advantage of the circuit arrangement of FIG. 6 is that, compared to the single utilization of a commutation capacitor connected in parallel with the commutation switches $S_1$ and $S_2$, a capacitor having only one-half the storage capacity is required for the commutation capacitor C. The commutation capacitor C which is charged in dependence on the current is available for the commutation process involving the secondly opened commutation switch $S_2$, which capacitor can greatly facilitate, in conjunction with the additional inductance $L_2$, the commutation of a current from the commutation switch $S_2$ into the auxiliary path so that the demands placed on the commutation switch $S_2$ are reduced.

Figure 8:
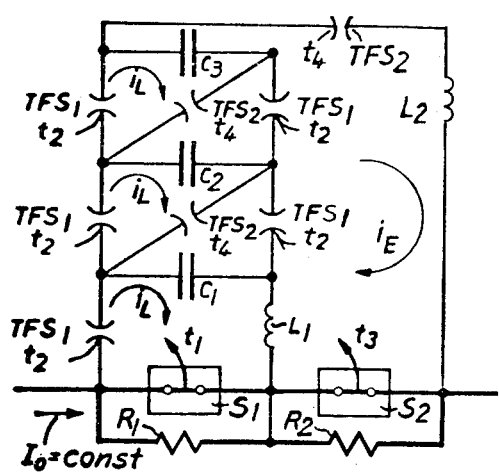
FIGS. 8 and 9 are respective schematic diagrams of two circuit arrangements according to further respective embodiments of the present invention in which the single commutation capacitance is a subdivided commutation capacitor.

FIG. 8 shows a circuit arrangement having the same basic operation as the circuit arrangement of FIG. 6. Only a portion of the single commutation capacitor C, shown as being subdivided into three capacitors $C_1$, $C_2$ and $C_3$, is utilized for the commutation of the current $i$ from the commutation switch $S_1$ in the circuit of FIG. 8. The advantage is that the current i from the commutation switch $S_1$ can be commutated into a large capacitance formed of the capacitors $C_1$, $C_2$ and $C_3$ so that the demands placed on the commutation switch $S_1$ are reduced and that, for the commutation from the commutation switch $S_2$ a capacitance partially charged in dependence on the current is present. The maximum possible precharge, however, in the case illustrated in FIG. 8 is only one third of the rated voltage of the total capacitance. The circuit of FIG. 8 includes energy dissipating resistors $R_1$ and $R_2$ connected respectively across commutation switches $S_1$ and $S_2$. Spark paths $TFS_1$ and $TFS_2$ are also provided in the circuit of FIG. 8. The capacitors $C_1$, $C_2$ and $C_3$ are preferably of equal capacity and equal rated voltage. The resistors $R_1$ and $R_2$ are preferably $R_2=3R_1$.

Figure 9:
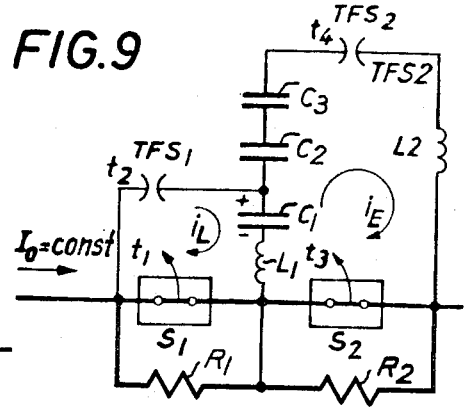

A further possibility of subdividing the commutation capacitor is shown in FIG. 9. Here the capacitors $C_1$, $C_2$ and $C_3$ formed by subdividing the commutation capacitance, are charged via a parallel circuit connection upon the commutation of current $I_0$ from thp commutation switch $S_1$, the total capacitance being $C_1+C_2+C_3$. For the commutation from the commutation switch $S_2$, the capacitors $C_1$, $C_2$ and $C_3$, which have been precharged in dependence on the current, are connected in series and discharged. The spark triggering paths TFS$_1$ and TFS$_2$, in the circuit arrangement of FIG. 9, have a period of several ms to accomplish restabilization. The triggering of the spark paths TFS$_1$ and TFS$_2$ may be effected, for example, in dependence on the arc voltage at the respective commutation switches S$_1$ and S$_2$. The triggering pulses must be brought, in part, to potentials of different magnitude. The advantage of the circuit arrangement of FIG. 9 is that the current I$_0$ is commutated from the commutation switch S$_1$ into a very high capacitance formed by the three parallel connected capacitors C$_1$, C$_2$ and C$_3$. The demands on the commutation switch S$_1$ can thus be greatly reduced compared to a commutation into a capacitance having only one-third the value, as it is necessary in the circuit of FIG. 6. The drawback of the reduced maximum possible precharge voltage for the circuit of FIG. 8 is also eliminated, using the circuit of FIG. 9, because the precharge voltage can be up to the full rated voltage of the total capacitance. The capacitors C$_1$, C$_2$ and C$_3$ are preferably of equal capacity and equal rated voltage. The resistors R$_1$ and R$_2$ are preferably R$_2$ = 3R$_1$.

Figure 10:
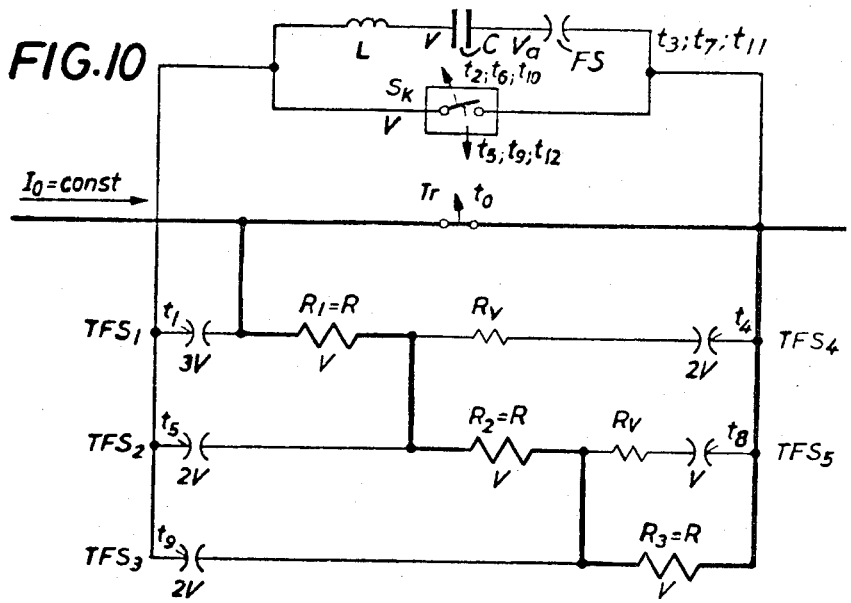
FIGS. 10 and 11 are respective schematic diagrams of two circuit arrangements for the multiple utilization of the single commutation capacitance and a single commutation path according to respective preferred further embodiments of the present invention.
Figure 11:
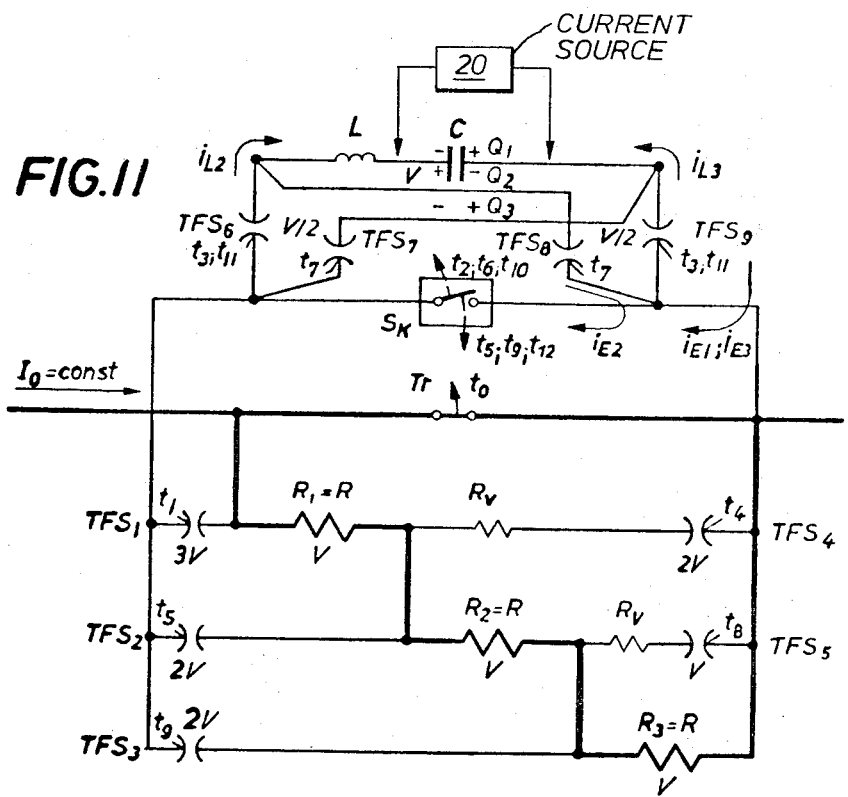

FIGS. 10 and 11 show circuit arrangements according to the present invention which are respectively very similar in operation to the circuits of FIGS. 3 and 5. In these two preferred embodiments, not only a single commutation capacitor C utilized several times, but also a single commutation switch S$_K$ provides commutation for all stages. The switching sequence, in the circuit arrangements of FIGS. 10 and 11, must be controlled over additional triggerable spark paths, as will be made clear below.

In the circuit arrangement of FIG. 10, a separating switch T$_r$ opens at time $t_0$, and a slight arc voltage is produced. At time $t_1$ a spark path TFS$_1$ is triggered, e.g., actuated by the level of the arc voltage across the separating switch T$_r$. The initial current I$_0$ commutates to the closed commutation switch S$_K$. At time $t_2$ the commutation switch S$_K$ opens, its arc being intensively cooled, and produces a voltage which, when a value $v_a$ is exceeded, causes a spark path FS to be actuated at time $t_3$. The current I$_0$ commutates from the commutation switch S$_K$ to the single commutation capacitor C which becomes charged. According to the voltage across the commutation capacitor C, a portion of the current I$_0$ is shunted into three series connected energy dissipating resistors R$_1$, R$_2$ and R$_3$ of equal size. If only a small current I$_0$ is switched and if the voltage drop I$_0$ 3 R, after complete current transfer to the dissipating resistors R$_1$, R$_2$ and R$_3$ is less than the rated capacitor voltage V, the commutation process is completed. With higher currents I$_0$ the triggering spark path TFS$_4$ is triggered at substantially that moment, time $t_4$, when the current I$_0$ exceeds the rated value which could be produced by rated voltage V. The current $i$, in such case, completely commutates to the first energy dissipating resistor R$_1$. The spark path TFS$_1$ is consequently without current and can again stabilize; it must not be retriggered in the further course of the current interrupting process.

At time $t_5$ the commutation switch S$_K$ closes and the commutation capacitor C discharges. At the same time, $t_5$, the triggering spark path TFS$_2$ is triggered, and the spark path TFS$_4$ is quenched. This phenomenon is supported by a low-ohmic preswitching resistor R$_V$, which is connected in series with the spark path TFS$_4$. The current $i$ flows via the energy dissipating resistor R$_1$, the spark path TFS$_2$ and the commutation switch S$_K$. The spark path TFS$_4$ must be stabilized again and must not be triggered again in the further course of the current interrupting process. At time $t_6$ the commutation switch S$_K$ reopens and produces an arc voltage which again causes the spark path FS to be actuated at time $t_7$. The current $i$ commutates into the commutation capacitor C and, depending on the level of the resulting voltage across the commutation capacitor C, to the series connected energy dissipating resistors R$_2$ and R$_3$. If the rated capacitor voltage V is exceeded in this series circuit, a spark path TFS$_5$ is triggered at time $t_8$. The current I$_0$ consequently flows through the energy dissipating resistors R$_1$, R$_2$ and the spark path TFS$_5$. The spark path TFS$_2$ is without current and again becomes stabilized. In the further course of the current interruption process the spark path TFS$_2$ must not again be triggered.

At time $t_9$ the commutation switch S$_K$ and the spark path TFS$_3$ close, and commutation capacitor C is discharged. The spark path TFS$_5$ is quenched and must not be triggered again in the further course of the current interrupting process. The current $i$ flows via the dissipating resistors R$_1$, R$_2$, the spark path TFS$_3$ and the commutation switch S$_K$. At time $t_{10}$ the commutation switch S$_K$ opens again and produces a voltage which causes the spark path FS to be actuated at time $t_{11}$. The current I$_0$ commutates to the commutation capacitor C which is charged until the entire current I$_0$ flows in the series connection of the dissipating resistors R$_1$, R$_2$ and R$_3$ which equal 3R. The spark path TFS$_3$ is quenched and must not again be triggered during the further current interrupting process. The current $i$, now at a low value, flows only through the dissipating resistors R$_1$, R$_2$ and R$_3$. The commutation process is thus terminated. At time $t_{12}$ the commutation switch S$_K$ closes and the commutation capacitor C is finally discharged. Thus, the switching circuit arrangement is prepared for further switching.

The principal advantage of the n-stage cascade circuit arrangement as shown in FIG. 10 is that the expenditures for the commutation capacitances and the commutation switching paths are only $1/n^{th}$ of a circuit with a separate commutation capacitor and a separate switching path for each stage. Only those types of switches which are able to open and close within a few ms are suited for use as the commutation switch S$_K$. When this high requirement is met, it is to the advantage of the switch that it carries current only during the short ms periods. The expenditures for auxiliary switches, the various triggering spark paths TFS shown in FIG. 10, and the associated devices are somewhat higher. The voltage ratings for the individual circuit elements shown in FIG. 10 are given as multiples of the rated commutation capacitor voltage V.

FIG. 11 shows a circuit arrangement with which, in addition to multiple utilization of a single commutation switch S$_K$ and a single commutation capacitor C, a current dependent pre-charge of the commutation capacitance C by the current I$_0$ to be interrupted is possible. The operation of the circuit arrangement is very similar to that of FIG. 10. Three series connected energy dissipating resistors R$_1$, R$_2$ and R$_3$ of equal size are provided. For the first commutation step the commutation capacitor C must be precharged in the indicated manner with a given polarity, from an auxiliary current source 20 as indicated by a charge Q$_1$. This additional source 20 may be eliminated if, instead of a separating switch $T_r$, a switching path having intensive arc cooling is used which is able to commutate the initial current $I_0$ into the commutation capacitor C. In such a case, a commutation switch, as shown, $S_K$ must then be open at time $t_0$. In the present example, however, it is assumed that the commutation capacitor C is precharged. At time $t_0$ the separating switch $T_r$ opens and produces a slight arc voltage which, when it exceeds a given value, triggers a spark path $TFS_1$. The current $I_0$ flows via the spark path $TFS_1$ and the commutation switch $S_K$. At time $t_2$ the commutation switch $S_K$ opens and, in dependence on the level of the produced arc voltage, spark paths $TFS_6$ and $TFS_9$ are triggered at time $t_3$. The commutation capacitor C discharges and discharge current $i_{E1}$ flows thereby supporting the switching path for the commutation of the current $I_0$ into the commutation capacitor C. The commutation capacitor C is charged, by current $i_{L2}$, to the opposite polarity, as indicated by the signs associated with charge $Q_2$. According to the voltage level across the commutation capacitor C, a current is shunted away from an energy dissipating resistor $R_1$. At time $t_4$ a spark path $TFS_4$ is triggered since the designated rated voltage of the commutation capacitor C has been exceeded. The current then flows via the energy dissipating resistor $R_1$ and the spark path $TFS_4$. The spark paths $TFS_1$, $TFS_6$ and $TFS_9$ do not carry current any longer and again become stabilized. At time $t_5$ the commutation switch $S_K$ is closed and a spark path $TFS_2$ is triggered. The current then flows through the dissipating resistor $R_1$, the spark path $TFS_2$ and the commutation switch $S_K$. At time $t_6$ the commutation switch $S_K$ opens again and at time $t_7$ spark paths $TFS_7$ and $TFS_8$ are triggered. The commutation capacitor C discharges and discharge current $i_{E2}$ flows via commutation switch $S_K$ and again supports the commutation of current $I_0$. The further steps are repeated and correspond to those of the circuit arrangement described in connection with FIG. 10. It is important, with consecutive communications, that the pairs of spark paths $TFS_6$, $TFS_9$ and $TFS_7$, $TFS_8$ are alternatingly triggered so that the discharge currents $i_{E1}$, $i_{E2}$ and $i_{E3}$ always flow against the current $I_0$ in the commutation switch $S_K$. After the last closing of the commutation switch $S_K$ at time $t_{12}$, the commutation capacitor C must, in the circuit arrangement shown, be again charged from the external current source 20 in the correct polarity, with the charge $Q_1$. The circuit arrangement is thus prepared for possible start of a new current interrupting sequence.

In contradistinction to the circuit arrangement of FIG. 10, the commutation switch $S_K$, as shown in FIG. 11, need not have intensive cooling of its arc. A vacuum tube or a semiconductive switch device, for example, can be used for the commutation switch $S_K$. With more stages provided, only three being illustrated, the lower are the demands placed on the commutation switch $S_K$ and the smaller becomes the commutation capacitor C. The number of spark triggering paths TFS increases with the additional stages.

The voltage ratings for the individual circuit elements shown in FIG. 11 are given as multiples of the rated commutation capacitor voltage V.

It will be understood that the above description of the present invention is susceptible to various modifications, changes and adaptations, and the same are intended to be comprehended within the meaning and range of equivalents of the appended claims.

We claim:

1. A circuit arrangement for the current limiting interruption of current flowing at high voltage in a line comprising, in combination:
   a. a plurality of individual commutation stages, each stage including energy dissipating means, said commutation stages being consecutively connected in said line such that upon consecutive switching on of said plurality of commutation stages, the respective energy dissipating means will be consecutively connected in series with each other in said line;
   b. a single commutation capacitance means; and
   c. means for consecutively switching said single commutation capacitance means into said individual commutation stages in parallel with respective ones of said energy dissipating means included in each stage; whereby the current to be cut off may be reduced to a residual value which may be switched off without excess voltage by opening a low capacity switch.

2. A circuit arrangement as defined in claim 1 further comprising commutation switching path means connected in series with said single commutation capacitance means, and wherein said means for consecutively switching said commutation capacitance means is operatively arranged for consecutively switching the series connected said single commutation capacitance means and said commutation switching path means into said individual commutation stages in parallel with the respective said energy dissipating means included in each stage.

3. A circuit arrangement as defined in claim 1 wherein each of said commutation stages includes a respective commutation switch, each of said commutation switches being connected in parallel with the series connection of its associated energy dissipating means and the commutation switch of the next successive commutation stage; wherein said means for consecutively switching said single commutation capacitance means includes respective commutation switching path means associated with each of said plurality of commutation stages, each said commutation switching path means including first auxiliary switching means for current dependent charging of said commutation capacitance means during commutation; and further comprising second auxiliary switching means and discharge resistance means connected in series with each other in parallel with said commutation capacitance means for discharging said commutation capacitance means.

4. A circuit arrangement as defined in claim 1 wherein each of said commutation stages includes a respective commutation switch, each of said commutation switches being connected in parallel with the series connection of its associated energy dissipating means and the commutation switch of the next successive commutation stage; wherein said means for consecutively switching said single commutation capacitance means includes respective commutation switching path means associated with each of said plurality of commutation stages, each said commutation switching path means including first auxiliary switching means for current dependent charging of said commutation capacitance means during commutation; and further comprising second and third auxiliary switching means in circuit with said commutation capacitance means for controllably discharging said commutation capacitance means during commutation with a discharge current which opposes the main commutation current to be commutated.

5. A circuit arrangement as defined in claim 1 wherein said plurality of commutation stages comprise a first commutation stage and a second commutation stage; said means for consecutively switching said commutation capacitance means comprise first and second commutation switching means connected in series with each other and first and second auxiliary switching means connected in series with said commutation capacitance means, said first auxiliary switching means and said commutation capacitance means being connected in parallel with said first commutation switching means, said second auxiliary switching means and said commutation capacitance means being connected in parallel with said second auxiliary switching means, and said first and second commutation switching means being connected in parallel with respective said energy dissipating means, whereby the commutation capacitor means may be charged in dependence on current in the first commutation stage and discharged in the second commutation stage by a current which opposes the main commutation current.

6. A circuit arrangement as defined in claim 5 wherein said commutation capacitance means is a divided capacitor, a portion of its capacitance being switchable into said first commutation stage, and all portions of its capacitance being switchable into said second commutation stage.

7. A circuit arrangement as defined in claim 5 wherein said commutation capacitance means is a divided capacitor having a plurality of partial capacitances, wherein said first auxiliary switching means are operatively arranged to charge said partial capacitances in parallel with each other and wherein said second auxiliary switching means are operatively arranged to discharge said partial capacitances in series with each other.

8. A circuit arrangement as defined in claim 1 further comprising inductance means, spark path means and separating switch means; said separating switch means being connected in said line and in parallel with said plurality of consecutively connected commutation stages, and wherein said means for consecutively switching said commutation capacitance means into said commutation stages includes a single commutation switch means connected in parallel with said commutation capacitance means via said inductance means and said spark path means connected in series with said commutation capacitance means, and auxiliary switching means for consecutively connecting and disconnecting said commutation capacitance means with the series connected said spark path means and said inductance means in parallel with each of said energy dissipating means.

9. A circuit arrangement as defined in claim 8 further comprising additional auxiliary switching means for charging said commutation capacitance means in dependence on commutation current and for discharging said commutation capacitance means during further commutation with a discharge current which opposes the main current to be commutated.

10. A circuit arrangement as defined in claim 9 further comprising means for initially charging said commutation capacitance means with a charge for producing a discharge current which opposes the initial main current to be commutated.

* * * * *